(12) United States Patent
Nordin et al.

(10) Patent No.: US 9,049,499 B2
(45) Date of Patent: Jun. 2, 2015

(54) PATCH FIELD DOCUMENTATION AND REVISION SYSTEMS

(75) Inventors: Ronald A. Nordin, Naperville, IL (US); Jack E. Caveney, Hinsdale, IL (US)

(73) Assignee: Panduit Corp., Tinley Park, IL (US)

( * ) Notice: Subject to any disclaimer, the term of this patent is extended or adjusted under 35 U.S.C. 154(b) by 852 days.

(21) Appl. No.: 12/505,280

(22) Filed: Jul. 17, 2009

(65) Prior Publication Data
US 2009/0275216 A1 Nov. 5, 2009

Related U.S. Application Data

(63) Continuation of application No. 11/766,427, filed on Jun. 21, 2007, now Pat. No. 7,563,102, which is a continuation of application No. 11/467,330, filed on Aug. 25, 2006, now Pat. No. 7,234,944.

(60) Provisional application No. 60/711,960, filed on Aug. 26, 2005.

(51) Int. Cl.
*H01R 29/00* (2006.01)
*H04Q 1/02* (2006.01)

(52) U.S. Cl.
CPC ............. *H04Q 1/136* (2013.01); *Y10S 439/955* (2013.01)

(58) Field of Classification Search
CPC .......... H01R 29/00; H01R 31/08; H04Q 1/14; H04Q 1/142; H04Q 1/149
USPC ..................... 439/49, 955, 488, 490
See application file for complete search history.

(56) References Cited

U.S. PATENT DOCUMENTS

| | | | |
|---|---|---|---|
| 2,824,954 A * | 2/1958 | Roper .............................. | 40/546 |
| 3,052,842 A | 9/1962 | Frohman et al. | |
| 3,573,789 A | 4/1971 | Sharp et al. | |
| 3,573,792 A | 4/1971 | Reed | |

(Continued)

FOREIGN PATENT DOCUMENTS

| | | |
|---|---|---|
| EP | 0297079 B1 | 3/1992 |
| EP | 0575100 B1 | 4/1998 |

(Continued)

OTHER PUBLICATIONS

Finding the Missing Link, Cabeling Installation & Maintenance, Jun./Jul. 2002, 4 pages.

(Continued)

*Primary Examiner* — Abdullah Riyami
*Assistant Examiner* — Vladimir Imas
(74) *Attorney, Agent, or Firm* — Christopher S. Clancy; Christopher K. Marlow

(57) ABSTRACT

A communication network device and corresponding patch field system are disclosed. The device includes a port module, ports, and an appliqué attached to a face of the port module. The appliqué includes a printed circuit board (PCB) with conductive pads. A patch cord connects the device with an intelligent patch panel. The patch cord contains at least one system wire. The patch panel is adapted to measure a resistance associated with each port via the system wire. An open circuit indicates that no patch cord is attached to the port, a resistance within a first range indicates that the patch cord is attached only to the port of the intelligent patch panel, and a resistance within a second range less than the first range indicates that the patch cord connects the intelligent patch panel and the device.

6 Claims, 7 Drawing Sheets

(56) References Cited

U.S. PATENT DOCUMENTS

| | | | |
|---|---|---|---|
| 3,914,561 A | 10/1975 | Schardt et al. | |
| 4,018,997 A | 4/1977 | Hoover et al. | |
| 4,072,827 A | 2/1978 | Oman | |
| 4,074,187 A * | 2/1978 | Miller et al. | 324/542 |
| 4,096,359 A | 6/1978 | Barsellotti | |
| 4,140,885 A | 2/1979 | Verhagen | |
| 4,196,316 A | 4/1980 | McEowen et al. | |
| 4,418,239 A * | 11/1983 | Larson et al. | 174/34 |
| 4,517,619 A | 5/1985 | Uekubo et al. | |
| 4,607,170 A * | 8/1986 | Wickman | 307/147 |
| 4,673,246 A | 6/1987 | Schembri | |
| 4,742,431 A * | 5/1988 | Igarashi | 361/749 |
| 4,773,867 A | 9/1988 | Keller et al. | |
| 4,796,294 A | 1/1989 | Nakagawara | |
| 4,869,566 A | 9/1989 | Juso et al. | |
| 4,901,004 A | 2/1990 | King | |
| 4,937,529 A * | 6/1990 | O'Toole et al. | 324/66 |
| 4,937,835 A | 6/1990 | Omura | |
| 4,950,169 A * | 8/1990 | Martin et al. | 439/44 |
| 4,956,835 A | 9/1990 | Grover | |
| 5,037,167 A | 8/1991 | Beaty | |
| 5,074,801 A | 12/1991 | Siemon | |
| 5,107,532 A | 4/1992 | Hansen et al. | |
| 5,111,408 A | 5/1992 | Amjadi | |
| 5,145,380 A | 9/1992 | Holcomb et al. | |
| 5,155,440 A * | 10/1992 | Huang | 324/539 |
| 5,161,988 A | 11/1992 | Krupka | |
| 5,170,327 A | 12/1992 | Burroughs | |
| 5,204,929 A | 4/1993 | Machall et al. | |
| 5,222,164 A | 6/1993 | Bass, Sr. et al. | |
| 5,226,120 A | 7/1993 | Brown et al. | |
| 5,233,501 A | 8/1993 | Allen et al. | |
| 5,265,187 A | 11/1993 | Morin et al. | |
| 5,270,658 A | 12/1993 | Epstein | |
| 5,305,405 A | 4/1994 | Emmons et al. | |
| 5,314,346 A * | 5/1994 | Owens et al. | 439/189 |
| 5,353,367 A | 10/1994 | Czosnowski et al. | |
| 5,394,503 A | 2/1995 | Dietz, Jr. et al. | |
| 5,432,847 A | 7/1995 | Hill et al. | |
| 5,483,467 A | 1/1996 | Krupka et al. | |
| 5,487,666 A | 1/1996 | DiGiovanni | |
| 5,521,902 A | 5/1996 | Ferguson | |
| 5,532,603 A | 7/1996 | Bottman | |
| 5,546,282 A | 8/1996 | Hill et al. | |
| 5,550,755 A | 8/1996 | Martin et al. | |
| 5,552,699 A * | 9/1996 | Redmer | 324/66 |
| 5,583,874 A | 12/1996 | Smith et al. | |
| 5,627,474 A * | 5/1997 | Baudisch | 324/539 |
| 5,684,796 A | 11/1997 | Abidi et al. | |
| 5,726,972 A | 3/1998 | Ferguson | |
| 5,727,055 A | 3/1998 | Ivie et al. | |
| 5,754,112 A | 5/1998 | Novak | |
| 5,764,043 A * | 6/1998 | Czosnowski et al. | 324/66 |
| 5,790,041 A | 8/1998 | Lee | |
| 5,832,071 A | 11/1998 | Voelker | |
| 5,847,557 A | 12/1998 | Fincher et al. | |
| 5,854,824 A | 12/1998 | Bengal et al. | |
| 5,870,626 A | 2/1999 | Lebeau | |
| 5,876,240 A | 3/1999 | Derstine et al. | |
| 5,878,030 A | 3/1999 | Norris | |
| 5,892,756 A | 4/1999 | Murphy | |
| 5,898,837 A | 4/1999 | Guttman et al. | |
| 5,915,993 A | 6/1999 | Belopolsky et al. | |
| 5,923,663 A | 7/1999 | Bontemps et al. | |
| 5,931,703 A | 8/1999 | Aekins | |
| 5,944,535 A | 8/1999 | Bullivant et al. | |
| 5,953,757 A * | 9/1999 | Blanks | 2/243.1 |
| 6,002,331 A | 12/1999 | Laor | |
| 6,041,352 A | 3/2000 | Burdick et al. | |
| 6,067,014 A | 5/2000 | Wilson | |
| 6,078,113 A | 6/2000 | True et al. | |
| 6,086,415 A | 7/2000 | Sanchez et al. | |
| 6,094,261 A | 7/2000 | Contarino, Jr. | |
| 6,175,865 B1 | 1/2001 | Dove et al. | |
| 6,222,908 B1 | 4/2001 | Bartolutti et al. | |
| 6,229,538 B1 | 5/2001 | McIntyre et al. | |
| 6,234,830 B1 | 5/2001 | Ensz et al. | |
| 6,243,510 B1 | 6/2001 | Rauch | |
| 6,285,293 B1 * | 9/2001 | German et al. | 340/687 |
| 6,330,307 B1 | 12/2001 | Bloch et al. | |
| 6,347,715 B1 | 2/2002 | Drozdenko et al. | |
| 6,350,148 B1 | 2/2002 | Bartolutti et al. | |
| 6,381,283 B1 | 4/2002 | Bhardwaj et al. | |
| 6,421,322 B1 | 7/2002 | Koziy et al. | |
| 6,424,710 B1 | 7/2002 | Bartolutti et al. | |
| 6,434,716 B1 | 8/2002 | Johnson et al. | |
| 6,437,894 B1 | 8/2002 | Gilbert et al. | |
| 6,453,014 B1 | 9/2002 | Jacobson et al. | |
| 6,456,768 B1 | 9/2002 | Boncek et al. | |
| 6,499,861 B1 | 12/2002 | German et al. | |
| 6,522,737 B1 | 2/2003 | Bartolutti et al. | |
| 6,535,367 B1 | 3/2003 | Carpenter et al. | |
| 6,561,827 B2 | 5/2003 | Früström et al. | |
| 6,574,586 B1 | 6/2003 | David et al. | |
| 6,577,243 B1 | 6/2003 | Dannenmann et al. | |
| 6,601,097 B1 | 7/2003 | Cheston et al. | |
| 6,626,697 B1 | 9/2003 | Martin et al. | |
| 6,629,269 B1 | 9/2003 | Kahkoska | |
| 6,646,447 B2 * | 11/2003 | Cern et al. | 324/539 |
| 6,684,179 B1 | 1/2004 | David | |
| 6,688,910 B1 | 2/2004 | Macauley | |
| 6,714,698 B2 | 3/2004 | Pfeiffer et al. | |
| 6,725,177 B2 | 4/2004 | David et al. | |
| 6,750,643 B2 | 6/2004 | Hwang et al. | |
| 6,778,911 B2 | 8/2004 | Opsal et al. | |
| 6,784,802 B1 * | 8/2004 | Stanescu | 340/687 |
| 6,798,944 B2 | 9/2004 | Pfeiffer et al. | |
| 6,802,735 B2 | 10/2004 | Pepe et al. | |
| 6,823,063 B2 | 11/2004 | Mendoza | |
| 6,848,947 B2 | 2/2005 | Chimiak | |
| 6,852,923 B2 * | 2/2005 | White et al. | 174/50 |
| 6,854,985 B1 * | 2/2005 | Weiss | 439/91 |
| 6,857,897 B2 | 2/2005 | Conn | |
| 6,871,156 B2 | 3/2005 | Wallace et al. | |
| 6,888,779 B2 * | 5/2005 | Mollicone et al. | 368/10 |
| 6,898,368 B2 | 5/2005 | Colombo et al. | |
| 6,991,496 B2 * | 1/2006 | Kuribayashi et al. | 439/620.04 |
| 6,992,491 B1 | 1/2006 | Lo et al. | |
| 7,005,861 B1 | 2/2006 | Lo et al. | |
| 7,027,704 B2 | 4/2006 | Frohlich et al. | |
| 7,028,087 B2 | 4/2006 | Caveney | |
| 7,030,623 B1 * | 4/2006 | Carpenter | 324/542 |
| 7,038,918 B2 | 5/2006 | AbuGhazaleh et al. | |
| 7,068,043 B1 | 6/2006 | Lo et al. | |
| 7,068,044 B1 | 6/2006 | Lo et al. | |
| 7,098,643 B1 * | 8/2006 | Kim | 324/66 |
| 7,154,382 B2 * | 12/2006 | Cern | 340/310.11 |
| 7,160,143 B2 | 1/2007 | David et al. | |
| 7,193,422 B2 | 3/2007 | Velleca et al. | |
| 7,207,846 B2 | 4/2007 | Caveney et al. | |
| 7,234,944 B2 * | 6/2007 | Nordin et al. | 439/49 |
| 7,436,310 B2 * | 10/2008 | Flaster et al. | 340/572.8 |
| 7,455,527 B2 * | 11/2008 | Nordin et al. | 439/49 |
| 7,488,206 B2 * | 2/2009 | Caveney et al. | 439/540.1 |
| 7,517,243 B2 * | 4/2009 | Caveney et al. | 439/489 |
| 7,519,000 B2 * | 4/2009 | Caveney et al. | 370/242 |
| 7,534,137 B2 * | 5/2009 | Caveney et al. | 439/540.1 |
| 7,547,150 B2 * | 6/2009 | Downie et al. | 385/92 |
| 7,563,102 B2 * | 7/2009 | Nordin et al. | 439/49 |
| 7,605,707 B2 * | 10/2009 | German et al. | 340/572.8 |
| 7,613,124 B2 * | 11/2009 | Caveney | 370/248 |
| 7,629,893 B2 * | 12/2009 | Horn | 340/687 |
| 7,636,050 B2 * | 12/2009 | Nordin et al. | 340/635 |
| 7,641,513 B2 * | 1/2010 | Hoath et al. | 439/540.1 |
| 7,656,903 B2 * | 2/2010 | Caveney | 370/475 |
| 7,756,047 B2 * | 7/2010 | Caveney | 370/248 |
| 7,760,094 B1 * | 7/2010 | Kozischek et al. | 340/572.1 |
| 7,768,418 B2 * | 8/2010 | Nordin | 340/687 |
| 7,772,975 B2 * | 8/2010 | Downie et al. | 340/572.1 |
| 7,782,202 B2 * | 8/2010 | Downie et al. | 340/572.1 |
| 7,811,119 B2 * | 10/2010 | Caveney et al. | 439/489 |
| 2002/0069277 A1 | 6/2002 | Caveney | |
| 2002/0071394 A1 | 6/2002 | Koziy et al. | |
| 2002/0076950 A1 | 6/2002 | Frostrom et al. | |

(56) References Cited

U.S. PATENT DOCUMENTS

| | | |
|---|---|---|
| 2002/0090858 A1 | 7/2002 | Caveney |
| 2002/0116485 A1 | 8/2002 | Black et al. |
| 2003/0061393 A1 | 3/2003 | Steegmans et al. |
| 2003/0152087 A1 | 8/2003 | Shahoumian et al. |
| 2004/0052471 A1 | 3/2004 | Columbo et al. |
| 2004/0065470 A1 | 4/2004 | Goodison et al. |
| 2004/0073597 A1 | 4/2004 | Caveney et al. |
| 2004/0077220 A1 | 4/2004 | Musolf et al. |
| 2004/0219827 A1 | 11/2004 | David et al. |
| 2005/0111491 A1 | 5/2005 | Caveney |
| 2005/0136729 A1 | 6/2005 | Redfield et al. |
| 2005/0141431 A1 | 6/2005 | Caveney et al. |
| 2005/0142910 A1* | 6/2005 | Levesque et al. ............ 439/120 |
| 2005/0142932 A1* | 6/2005 | Levesque et al. .......... 439/540.1 |
| 2005/0185912 A1* | 8/2005 | Levesque et al. ............ 385/135 |
| 2005/0186819 A1 | 8/2005 | Velleca et al. |
| 2005/0195584 A1 | 9/2005 | AbuGhazaleh et al. |
| 2005/0224585 A1 | 10/2005 | Durrant et al. |
| 2005/0231325 A1 | 10/2005 | Durrant et al. |
| 2005/0239339 A1 | 10/2005 | Pepe |
| 2005/0245127 A1 | 11/2005 | Nordin et al. |
| 2006/0047800 A1 | 3/2006 | Caveney et al. |
| 2006/0234524 A1* | 10/2006 | Abadia ........................ 439/74 |
| 2006/0282529 A1 | 12/2006 | Nordin |
| 2007/0032124 A1 | 2/2007 | Nordin et al. |
| 2007/0049127 A1* | 3/2007 | Nordin et al. ................ 439/676 |
| 2007/0117444 A1 | 5/2007 | Caveney et al. |
| 2007/0132503 A1* | 6/2007 | Nordin ......................... 327/518 |
| 2007/0184712 A1* | 8/2007 | Martich et al. ............ 439/540.1 |
| 2007/0243725 A1* | 10/2007 | Nordin et al. ................ 439/49 |
| 2007/0247284 A1* | 10/2007 | Martin et al. ............... 340/10.1 |
| 2008/0124971 A1* | 5/2008 | Hoelzel ...................... 439/540.1 |
| 2008/0168283 A1* | 7/2008 | Penning ........................ 713/310 |
| 2009/0073957 A1* | 3/2009 | Newland et al. ............. 370/352 |
| 2009/0088908 A1* | 4/2009 | Karam ......................... 700/297 |
| 2009/0180426 A1* | 7/2009 | Sabat et al. .................. 370/328 |
| 2009/0275216 A1* | 11/2009 | Nordin et al. ................ 439/49 |
| 2010/0085156 A1* | 4/2010 | Tucker ......................... 340/10.1 |
| 2010/0252783 A1* | 10/2010 | Yeh .............................. 252/513 |

FOREIGN PATENT DOCUMENTS

| | | |
|---|---|---|
| EP | 0745229 B1 | 3/2003 |
| FR | 2680067 A1 | 1/1991 |
| GB | 2236398 A | 4/1991 |
| GB | 2347752 A | 9/2000 |
| JP | 676878 | 3/1994 |
| JP | 2004349184 | 12/2004 |
| WO | 9926426 A1 | 5/1999 |
| WO | 0060475 A1 | 10/2000 |
| WO | 0155854 A1 | 8/2001 |
| WO | 2004044599 A2 | 5/2004 |
| WO | 2005072156 A2 | 8/2005 |
| WO | 2006052686 A1 | 5/2006 |

OTHER PUBLICATIONS

IntelliMAC—The New Intelligent Cable Management Solution by iTRACS and NORDX/CDT, Press Release 2003, 2 pages.
RiT Technologies, Ltd. SMART Cabling System, RiT Technologies, Ltd., 2004, 4 pages.
Ortronics Launches iTRACS—Ready Structured Cabling Solutions, News Release, Mar. 7, 2003, 3 pages.
The SYSTIMAX iPatch System—Intelligent Yet Simple Patching Management for the Cabling Infrastructure, CommScope, Inc., 2004, 8 pages.
White Paper—Intelligent Patching, David Wilson, Nov. 2002, 5 pages.
PatchView for the Enterprise (PV4E) Technical Background/Networks for Business, Jun. 24-26, 2003, 3 pages.
RiT Technologies, Ltd. Go Patch-less, May 2000 Edition of Cabling Systems, 4 pages.
Intelligent Cable Management Systems—Hot Topics, Trescray, 2 pages.
Brand-Rex Network Solutions Access Racks Cat 5E6 Cabling UK, 6 pages.
Molex Premise Networks/Western Europe-Real Time Patching System, Molex Premise Networks, 2001, 1 page.
Product of the Week, Molex's Real Time Patching System, 3 pages.
EC&M Taking Note of Patch Panel Technology, Mark McElroy, Jun. 1, 1998, 3 pages.
Intelligent Patching SMARTPatch for the Enterprise (SP4E), 8 pages.

* cited by examiner

PATCH FIELD DOCUMENTATION AND REVISION SYSTEMS

CROSS-REFERENCE TO RELATED APPLICATIONS

This application is a continuation of U.S. patent application Ser. No. 11/766,427, filed Jun. 21, 2007, now U.S. Pat. No. 7,563,102, which is a continuation of U.S. patent application Ser. No. 11/467,330, filed Aug. 25, 2006, now U.S. Pat. No. 7,234,944 which claims priority to U.S. Provisional Application Ser. No. 60/711,960, filed on Aug. 26, 2005; both applications are incorporated by reference herein in their entireties.

TECHNICAL FIELD

The present invention relates to documentation systems and more particularly relates to a system for documenting and revising patch cord connections in a communications network patch field.

BACKGROUND

Patch panels are used in communications networks as intermediate elements between horizontal cabling (to which endpoint devices such as computers and telephones are connected) and network switches. When physical connections between endpoint devices and network switches are moved, added, or changed, patch panels are the points at which technicians complete the required moves, additions, or changes of cabling within patch fields. It is important to keep track of changes that are made to patch cord connections within the patch field. Proper documentation of changes in the patch field assures that the routing of patch cords is always known and further assures that any future changes are completed correctly.

In interconnect network configurations, one patch panel is placed between the horizontal cabling and the network switch. In an interconnect configuration, the documentation of patch cord connections between the patch panel and the switch will provide the necessary documentation of connections between the switch and the horizontal cabling. In cross-connect network configurations, two patch panels are placed between the horizontal cabling and the network switch. In a cross-connect configuration, the documentation of patch cord connections between the two patch panels will provide the necessary documentation of connections between the switch and the horizontal cabling. It is desirable to have a patch cord management system that will support both interconnect and cross-connect configurations. It is also desirable for a patch cord management system to have a minimal impact on existing networks.

SUMMARY OF THE INVENTION

According to one embodiment of the present invention, a patch cord management system supports patch cord management in communications networks having an interconnect configuration. In one embodiment, appliqués are applied to network switches—such as Ethernet switches—to provide for the management of patch cord connections between an intelligent patch panel and the network switch.

In one embodiment, indicator lights are provided to guide the installation and management of patch cord connections. Each network switch port that is connected to an intelligent patch panel is uniquely identifiable by the intelligent patch panel.

According to another embodiment of the present invention, a patch cord management system supports patch cord management in communications networks having a cross-connect configuration.

DETAILED DESCRIPTION OF PREFERRED EMBODIMENTS

Figure 1:
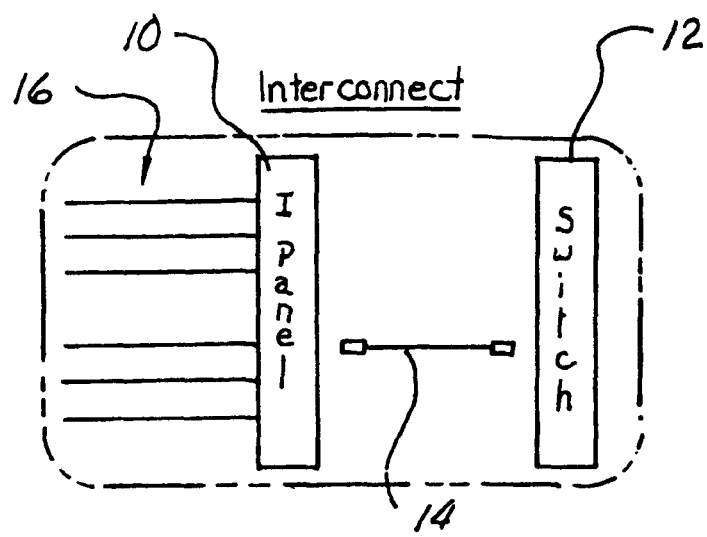
FIG. 1 is a block diagram of an intelligent patch panel and a network switch in a network having an interconnect configuration.

The present invention is directed to methods and systems for documenting and guiding patch cord changes in a patch field of a communications network. FIG. 1 shows a preferred embodiment, in which an intelligent patch panel 10 and a network switch 12 in a communications network are connected in an interconnect configuration. This embodiment provides real-time documentation which is reliable under all conditions and it provides an efficient indicator light system on all patch panel and switch ports (jacks) to guide technicians when installing or removing patch cords. In the embodiments shown and described herein, the network switch is an Ethernet switch, but it is to be understood that the present invention can be applied to other types of networks.

A patch cord 14 connects a port on the switch 12 to a port on the intelligent patch panel 10. Horizontal cabling 16 connects the intelligent patch panel 10 to endpoint devices, such as computers and telephones.

Figure 2:
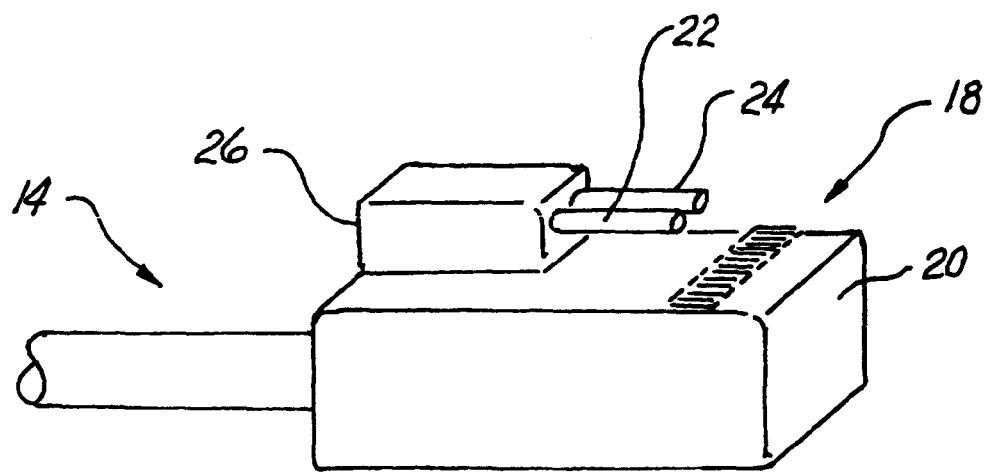
FIG. 2 is an upper left side view of a plug for a 10-wire patch cord with two pogo pins.

In a preferred embodiment as illustrated in FIG. 2, the patch cord 14 is a ten-wire patch cord. Eight of the wires comprise a standard four-pair Ethernet channel corresponding to the standard plug contacts 18 on the plug 20. The ninth wire and the tenth wire terminate at first and second pogo pins 22 and 24, respectively, for connection to contacts provided on intelligent patch panels and on switches. The pogo pins are provided in a pogo pin module 26 which is asymmetrically positioned to allow for situations where the jacks on a switch are vertically adjacent each other (for example, in a 2×24 arrangement).

Figure 3:
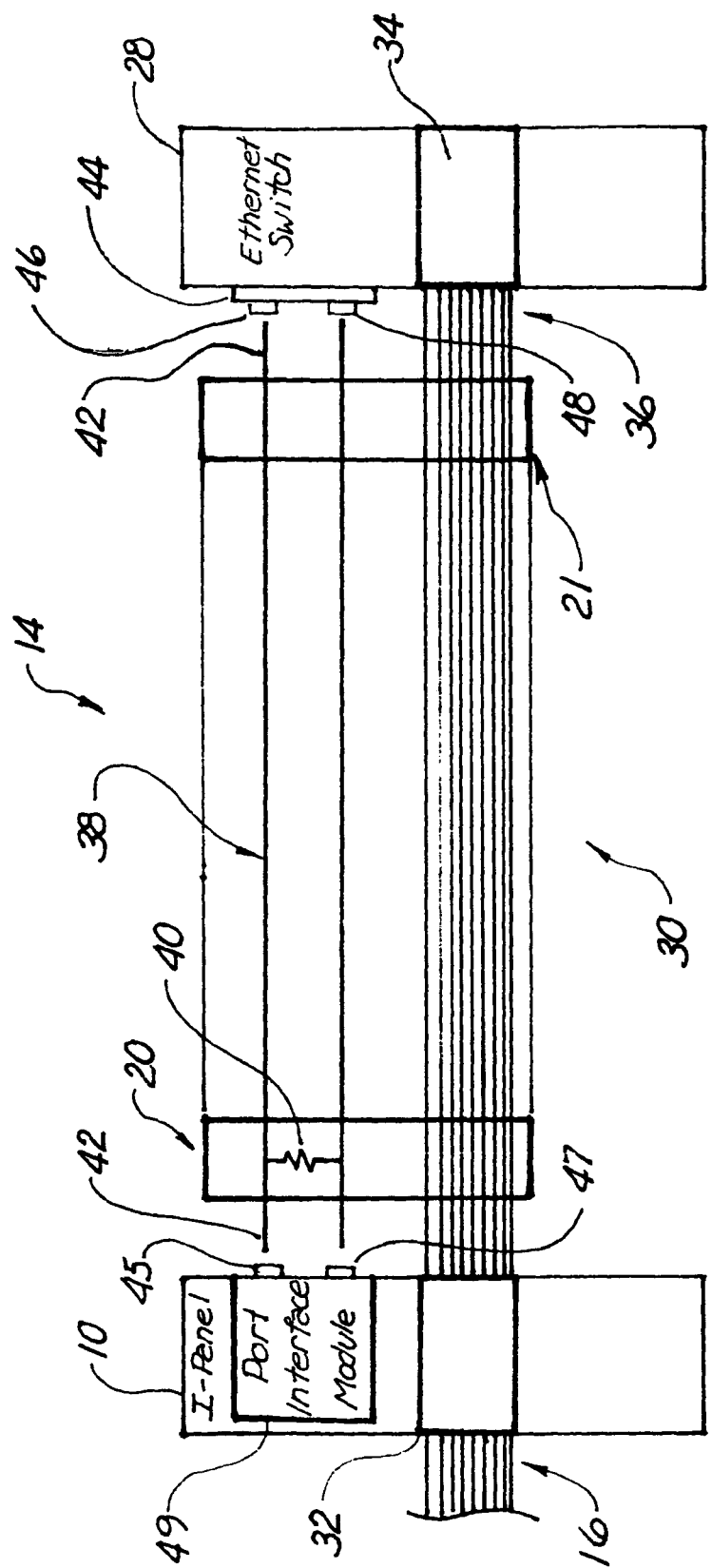
FIG. 3 is block diagram of a patch cord connection in a patch cord management system according to one embodiment of the present invention.

FIG. 3 shows a patch cord 14 installed between an intelligent patch panel 10 and an Ethernet switch 28 in a system that allows for patch cord documentation and revision in the patch field 30 between the intelligent patch panel 10 and the Ethernet switch 28. Patch cord documentation and revision is enabled because each Ethernet switch 28 (or group of ports on an Ethernet switch) is assigned a unique identifier code, and each port 34 on that Ethernet switch 28 (or within that group of Ethernet switch ports) is assigned a sequential port number (i.e. 1-24 or 1-48). A similar identification procedure is used for each intelligent patch panel or group of ports on an intelligent patch panel. Thus, each switch port 34 that is connected to an intelligent patch panel 10 is provided with a unique identifier code.

The group of switches and the patch panels to which they are connected are assigned a unique identifier and this is transmitted along with the patch panel group, switch group, and port I.D.s of ports in the group to a Network Management System (NMS) by an intelligent patch panel.

The patch cord 14 comprises four signal pairs 36 and one system pair 38 consisting of the ninth and tenth conductors. The signal pairs 36 provide standard Ethernet signal connectivity. The system pair 38 enables the intelligent patch panel 10 to send signals to electronic components positioned on the face of the Ethernet switch 28. These electronic components may be provided on printed circuit boards (PCBs) provided in appliqués that are attached to the face of the Ethernet switch 28. A resistor 40 with a high resistance is placed across the system pair 38 of the patch cord 14. In the embodiment of FIG. 3, the resistor is placed within a plug of the patch cord 14.

The system pair 38 makes contact via probes 42 with conductive pads 45 and 47 on the face of the intelligent patch panel 10 and with conductive pads 46 and 48 on an appliqué 44 attached to the Ethernet switch 28. The probes 42 may be pogo pins, as discussed above. The probes 42 complete an electrical circuit between a PCB in the intelligent patch panel 10 and a PCB in the appliqué 44 when the patch cord 14 is installed between the patch panel port 32 and the switch port 34. The PCB in the intelligent patch panel 10 may include a port interface module 49, which implements the functions of the intelligent system as further discussed below.

Installation and/or revision of the plugs 20 of inter-connect patch cords 14 is preferably guided by a wireless portable PC (a work order PC) which provides work orders in sequence to the responsible technician.

When a patch cord 14 is installed, one plug is plugged into the intelligent patch panel 10 with the guidance of an indicator light adjacent the correct port. An indicator light adjacent to the port to which the patch cord was connected communicates to the technician that this step was correct or incorrect. This portion of the system is the Patch Panel Plug Presence System.

When the other end of this patch cord 14 is plugged into a switch port 34, the intelligent system in the intelligent patch panel 10 detects this step and an indicator light adjacent to the port which the patch cord was connected to will communicate to the technician that this step was correct or incorrect. This portion of the system is the Switch Plug Presence System.

The patch cord removal guidance is similar to the above.

When a patch cord 14 is installed, an intelligent system in the intelligent patch panel 10 monitors the connection between the two ports 32 and 34 in real time. If the patch field 30 was newly installed or if the system operation was temporarily interrupted, the system immediately determines the documentation of the interconnect patch field 30. This documentation is therefore completely reliable and in real time.

Each intelligent patch panel 10 includes circuits and circuit components which accomplish all the above and which communicate with an NMS via Ethernet signals through a switch. According to one embodiment, the only electrical connections to each intelligent patch panel 10 (other than patch cord connections) are the four-pair Ethernet cable for connection to the NMS and a power cord.

Figure 4:
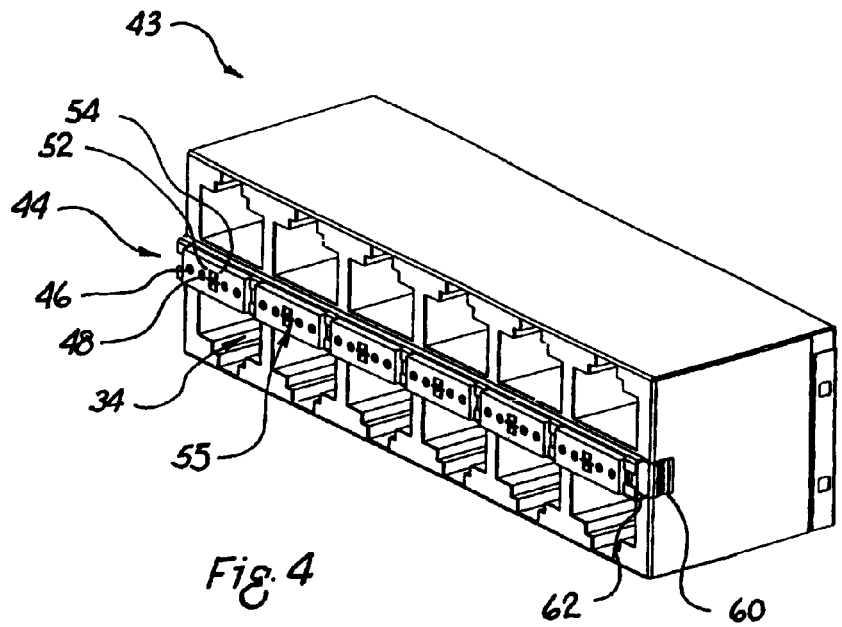
FIG. 4 is a perspective view of a switch port module with an appliqué.

Turning now to FIG. 4, a perspective view of a switch module 43 with an appliqué 44 is shown. The switch module 43 has twelve switch ports 34, but it is to be understood that the present invention may be scaled for use with switch modules having fewer or more ports. The appliqué 44 has first and second conductive pads 46 and 48 for each switch port 34. The conductive pads 46 and 48 are conductively connected to switch port identification circuits 50 as described below with reference to FIGS. 11-13. As shown in FIG. 4, the appliqué 44 may be attached to a switch port module 43 by clips 60 formed in a frame 62.

Figure 5:
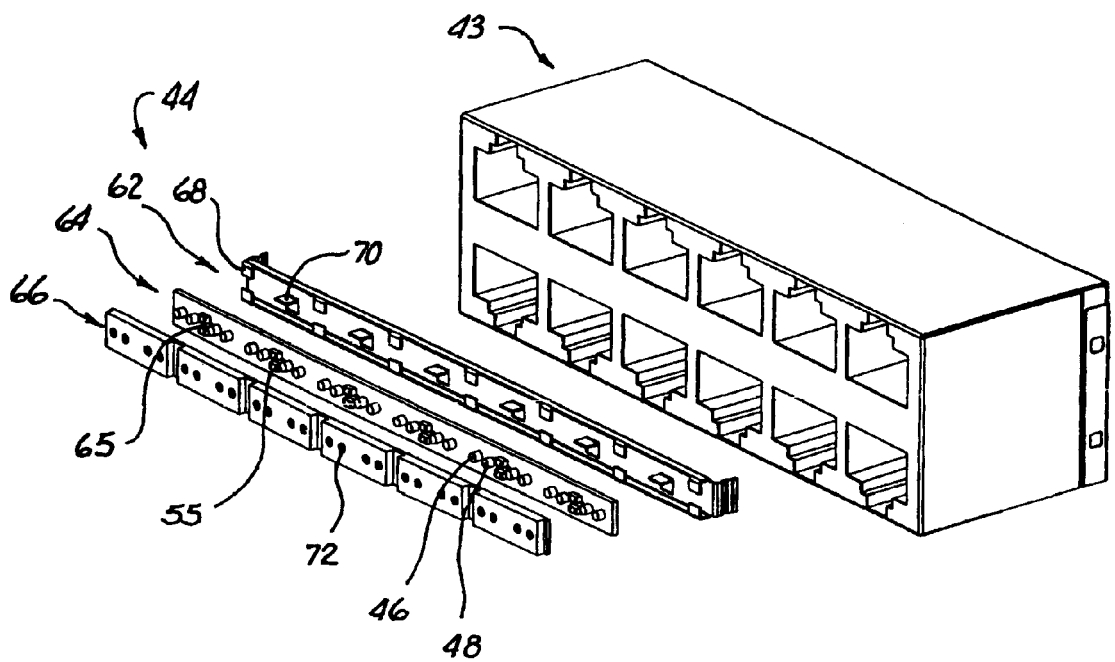
FIG. 5 is an exploded perspective view of a switch port module with an appliqué.
Figure 11:
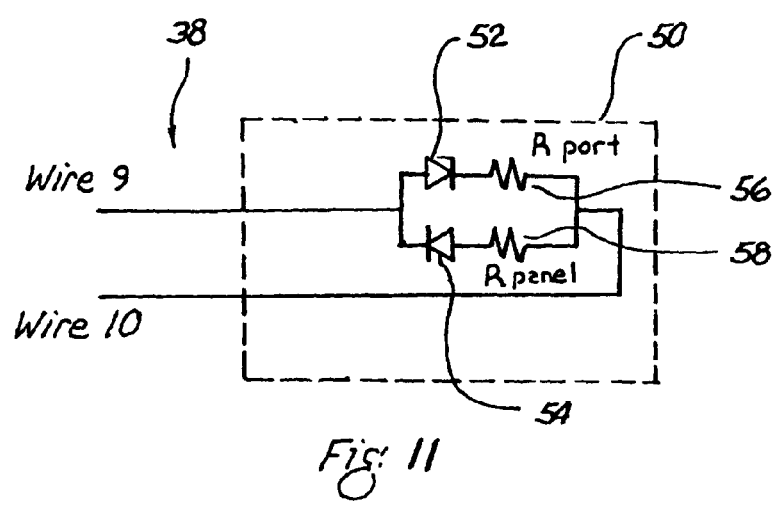
FIG. 11 is a schematic diagram of a port identification circuit.
Figure 12:
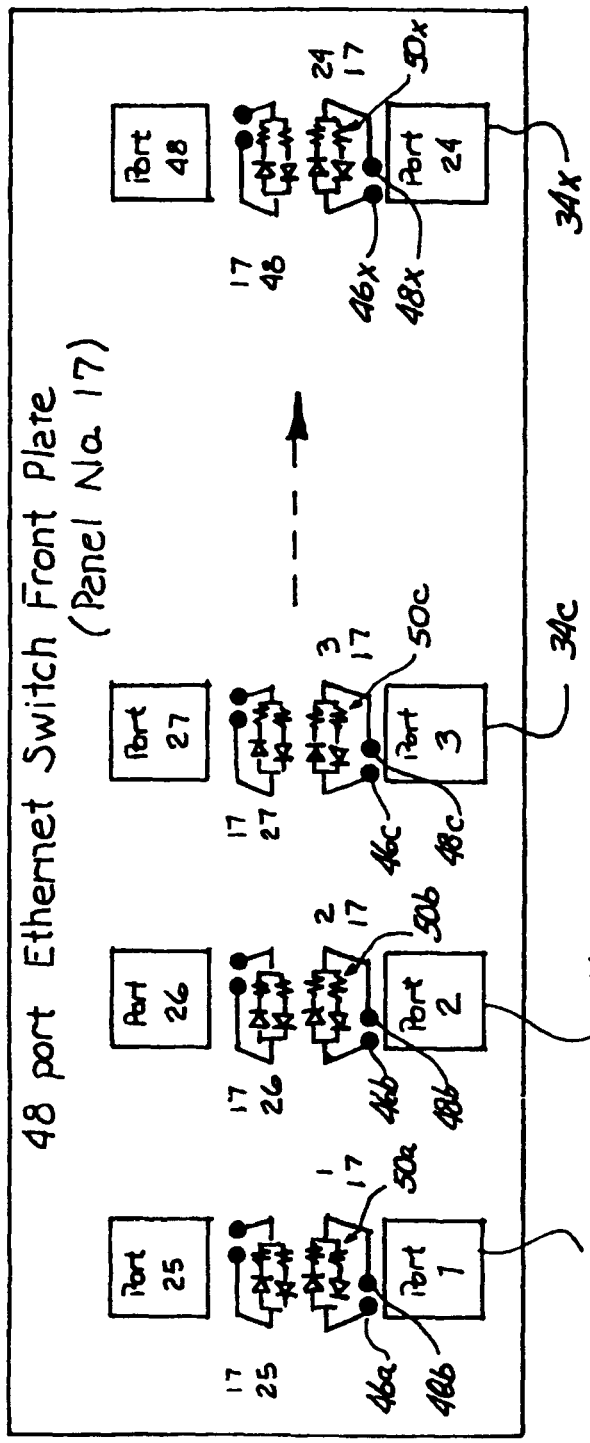
FIG. 12 is a block diagram showing multiple port identification circuits for an Ethernet switch.

FIG. 5 is an exploded view of the appliqué 44 attached to the switch module 43. The appliqué 44 comprises three main parts: a frame 62, a circuit board 64, and a cover 66. The frame 62 is preferably constructed of metal and is provided with mounting tabs 68 for retaining the circuit board 64 and the cover 66. Reflectors 70 are formed in the frame 62 to optically isolate the LED modules 55 from one another. This assures that light emitted from upper or lower LED modules 55 are not mistakenly associated with wrong switch ports 34 by a technician. The circuit board 64 has the conductive pads 46 and 48 as well as the LED modules 55 and the other circuitry for the switch port identification circuits 50 (as shown in FIGS. 11 and 12). The circuit board 64 has circuit board apertures 65 to accommodate the reflectors 70. The cover 66 is preferably constructed of a clear material and is provided with cover apertures 72 to allow probes 42 of patch cords to make contact with the conductive pads 46 and 48 on the circuit board 64. According to one embodiment, the appliqué 44 is constructed by positioning the circuit board 64 between the cover 66 and the frame 62 and bending the mounting tabs 68 into the mounting positions shown in FIG. 5, holding the circuit board 64 between the cover 66 and the frame 62.

Figure 6:
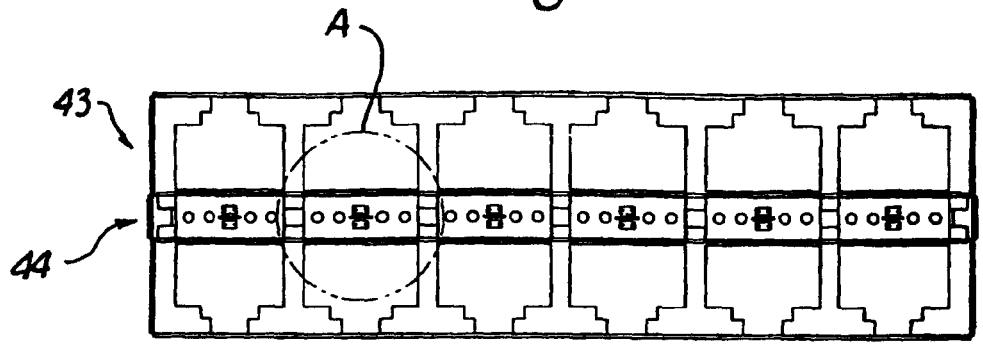
FIG. 6 is a front view of a switch port module with an appliqué.
Figure 7:
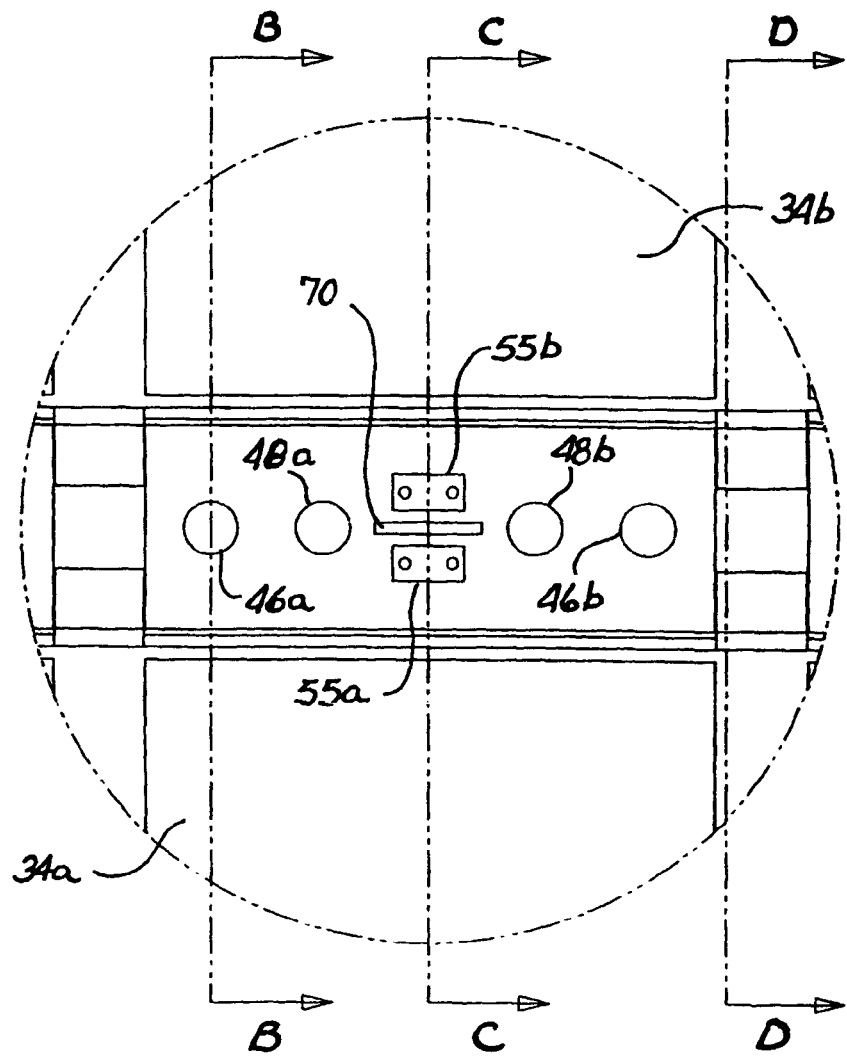
FIG. 7 is a detail view of the detail "A" of FIG. 6.
Figure 8:
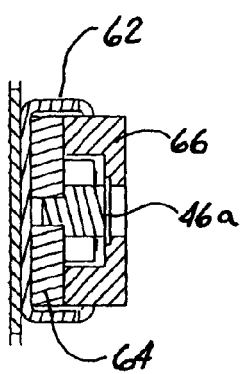
FIG. 8 is a cross-sectional view along the line "B-B" of FIG. 7.
Figure 9:
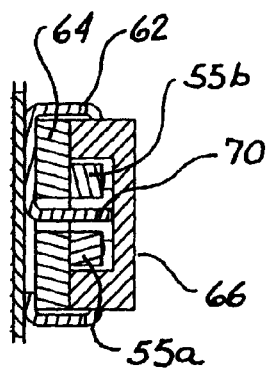
FIG. 9 is a cross-sectional view along the line "C-C" of FIG. 7.
Figure 10:
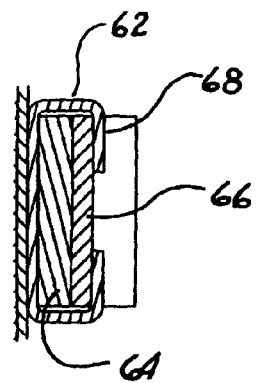
FIG. 10 is a cross-sectional view along the line "D-D" of FIG. 7.

FIG. 6 is a front view of a switch module 43 with an appliqué 44 mounted thereon. FIG. 7 is a detail view of the detail "A" of FIG. 6. According to an embodiment utilizing the plug 20 of FIG. 2, the first and second conductive pads 46a and 48a on the left side of the view of FIG. 7 are associated with the lower switch port 34a. The first and second conductive pads 46b and 48b on the right side of the view of FIG. 7 are associated with the upper switch port 34b. Also shown in FIG. 7 are bi-color LED modules 55a and 55b, respectively associated with the lower and upper switch ports 34a and 34b. The reflector 70 separates the bi-color LED modules 55a and 55b. FIGS. 8, 9, and 10 are cross-sectional views along the lines B-B, C-C, and D-D, respectively, of FIG. 7. The cross-sectional view of FIG. 8 shows the first conductive pad 46a. The cross-sectional view of FIG. 9 shows the bi-color LED modules 55a and 55b and the reflector 70. The cross-sectional view of FIG. 10 shows the mounting tabs 68 of the frame 62 bent over the cover 66.

As further discussed below with reference to FIGS. 11-13, the conductive pads 46 and 48 on the appliqué 44 are connected to signature resistors having different values of resistance corresponding to individual switch ports. The signature resistors have unique values corresponding to each switch port or each group of switch ports. The intelligent patch panel 10 continuously makes resistance measurements across the system pair 38. If an open circuit is measured, this implies that no patch cord 14 is attached to the intelligent patch panel. If a high resistance is measured, this implies that the patch cord 14 is only attached to the intelligent patch panel 10. If a resistance within the range of the resistance values of the signature resistors in the appliqué 44 at the Ethernet switch 12 is measured, this implies that both ends of the patch cord 14 are attached.

Turning to FIGS. 11 and 12, switch port identification circuits 50 are shown. The switch port identification circuits 50 comprise light-emitting diodes (LEDs) 52 and 54 (which may be implemented as bi-color LED modules 55), port signature resistors 56, and panel signature resistors 58. In one embodiment, LED 52 is red and LED 54 is green. The panel signature resistors 58 may indicate the switch panel corresponding to each port, or they may be substituted for signature resistors indicating particular switches or switch groups containing each port. According to one embodiment, each switch module in a switch is provided with a different signature resistor. In this embodiment, the signature resistors 58 would not be panel signature resistors, but rather would be switch module signature resistors. When measuring the port signature resistors 56, a forward bias is applied to the ninth wire and the resistance is measured. When measuring the panel signature resistor 58 (or other associated group signature resistor), a reverse bias is applied to the ninth wire and the resistance is measured. FIG. 12 is a block diagram showing the switch port identification circuits 50 associated with each port of a 48-port switch. Conductive pads 46 and 48 are also shown.

In one embodiment, a constant current source in the intelligent patch panel is used to light revision lights for the revision system to provide uniform illumination.

According to one embodiment, the revision light system for each patch panel port is as follows:

| | |
|---|---|
| Green solid: | Install plug |
| Green off: | Installed correctly |
| Red pulsating: | Plug was installed in wrong port; remove |
| Red off: | Removed correctly |
| Green pulsating: | Remove plug |
| Green off: | Removed correctly |
| Red solid: | Adjacent plug was removed erroneously; reinstall |
| Red off: | Adjacent plug reinstalled correctly |

The revision light system for each switch port is as follows:

| | |
|---|---|
| Green solid: | On for time delay after correct installation |
| Red pulsating: | Plug was added to wrong port; remove |
| Green pulsating: | Remove plug |
| Yellow pulsating: (Light that was green changed to yellow) | Wrong plug was removed; replace plug which was erroneously removed; when replaced, yellow pulsating light changes to green pulsating. |

The yellow indicator light is obtained by the combination of the red and green indicator lights. According to one embodiment, an audible alarm may be initiated by an intelligent patch panel to indicate to the installer that a wrong operation was performed (for example, if an incorrect plug was removed from an Ethernet switch port).

When an error in plug installation or removal has occurred, the system provides an indicator light and/or audible alarm from the associated patch panel. An alarm notice and details of the error and remedy are provided on the work order PC. No further revision steps are ordered until the error has been corrected.

It should be noted that a switch jack light will not guide the installation of a plug to the switch 12 because the power for the light is supplied through the patch cord 14. However, if a plug is correctly installed, a green indicator light will turn on for a time delay. If a plug is installed in an incorrect port, a flashing red indicator light adjacent to that port will stay on until the plug is removed. Such a temporary incorrect patch cord connection should not be detrimental because that incorrect switch port should not be energized.

Figure 13:
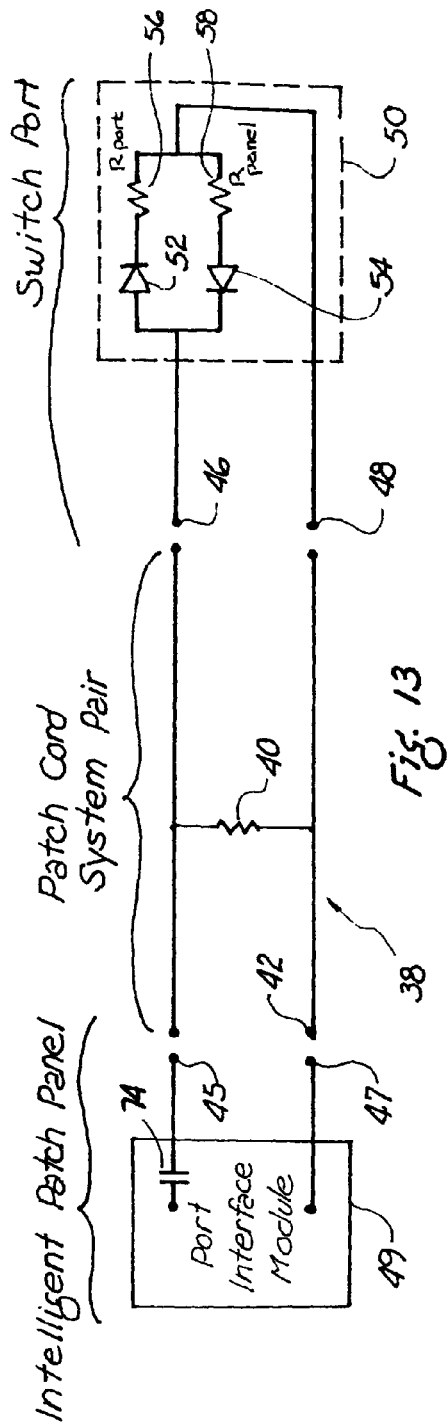
FIG. 13 is a schematic diagram of a patch cord system pair connection in a patch field documentation and revision system.

FIG. 13 is a schematic diagram of a patch cord system pair connection between a port interface module 49 of an intelligent patch panel and a port identification circuit 50 located at an Ethernet switch port. The port interface module 49 is connected via conductive pads 45 and 47 to probes 42 of the system pair 38 of the patch cord. The system pair 38 of the patch cord is further connected to the conductive pads 46 and 48 at the switch port. The port interface module 49 implements the functions necessary to support the intelligent system of the intelligent patch panel 10. According to one embodiment, the port interface module 49 comprises circuitry to implement three functions of the intelligent system of the intelligent patch panel: (a) detecting the presence of a plug in the intelligent patch panel; (b) identification of Ethernet switch ports and detection of the presence of plugs in the switch ports; and (c) powering indicator lights at the Ethernet switch ports. Detection of plug presence in the patch panel ports and switch ports and identification of Ethernet switch ports are preferably accomplished using AC signals generated by the port interface module 49. The resulting response signals are detected by the port interface module 49, allowing plug detection and Ethernet switch port identification. LEDs 52 and 54 in the port identification circuit 50 may be powered by the port interface module 49, either one-at-a-time or simultaneously, via pulsed DC or AC. A capacitor 74 protects the circuitry of the port interface module 49 from high voltages that might be placed across the system pair 38 of the patch cord.

Figure 14:
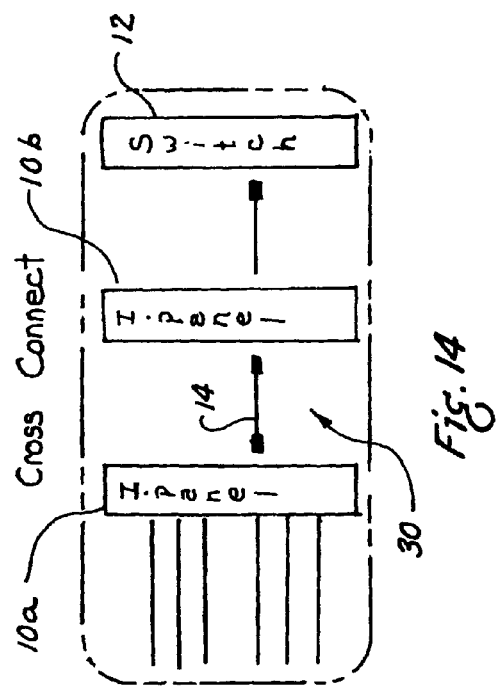
FIG. 14 is a block diagram of intelligent patch panels and a network switch in a network having a cross-connect configuration.

Systems and methods according to the present invention may be adapted for use in a cross-connect network. In the cross-connect embodiment as shown in FIG. 14, in which the relevant patch field 30 is between two intelligent patch panels 10a and 10b, the same patch cords 14 as described above are used between the intelligent patch panels 10a and 10b. The plug presence part of the above-described system is utilized, providing this benefit without the need for additional dedicated plug sensors. However, the documentation portion of this system may be as described in U.S. patent application Ser. No. 11/265,316 and U.S. Provisional Patent Application Ser. No. 60/624,753. In this embodiment, each patch panel communicates with a control system via Ethernet signals.

Other embodiments can accomplish the goals of the present invention utilizing different circuit elements (e.g., resonant circuits providing frequencies associated with port/panel identification information) or chips (e.g., I.D. chips). In addition, other embodiments utilize local power and/or a signal and/or ground connections to each switch PCB. The number of system wires in each patch cord and the number of plug probes could also vary. For example, in one alternative embodiment foregoing plug detection at the patch panel, one system wire and system grounding are used in place of two system wires for switch port identification. In alternative embodiments, the switch can be replaced with a patch panel, with an appliqué being applied to the patch panel.

The invention claimed is:

1. An appliqué for use with a patch panel in a mapping system comprising:
   first and second conductive pads, the first and second conductive pads associated with a first port of the patch panel;
   a first signature resistance in series with a first diode, the orientation of the first diode requiring the first signature resistance to be measured between the first and second conductive pads with a forward bias or polarity; and
   a second signature resistance in series with a second diode, the orientation of the second diode requiring the second signature resistance to be measured between the first and second conductive pads with a reverse bias or polarity, the first signature resistance being different than the second signature resistance.

2. The appliqué of claim 1 further comprising:
   third and fourth conductive pads, the third and fourth conductive pads associated with a second port of the patch panel;
   a third signature resistance in series with a third diode, the orientation of the third diode requiring the third signature resistance to be measured between the third and fourth conductive pads with a forward bias or polarity;
   a fourth signature resistance in series with a fourth diode, the orientation of the fourth diode requiring the fourth signature resistance to be measured between the third and fourth conductive pads with a reverse bias or polarity, the third signature resistance being different from the first, second, and fourth signature resistances, the fourth signature resistance being equal to the second signature resistance.

3. The appliqué of claim 2 further comprising a frame, a printed circuit board, and a cover.

4. The appliqué of claim 3 wherein the frame is made of a clear material.

5. The appliqué of claim 4 further comprising light emitting diodes.

6. The appliqué of claim 5 wherein the frame comprises reflectors formed therein to optically isolate the light emitting diodes from each other.

* * * * *